(12) United States Patent
Dentler et al.

(10) Patent No.: US 7,891,527 B2
(45) Date of Patent: Feb. 22, 2011

(54) PARTICULATE SOLIDS INJECTOR

(75) Inventors: David B. Dentler, Victoria, TX (US); Charles J. Whatley, Goliad, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 12/518,963

(22) PCT Filed: Dec. 12, 2007

(86) PCT No.: PCT/US2007/025679
§ 371 (c)(1),
(2), (4) Date: Jan. 18, 2010

(87) PCT Pub. No.: WO2008/076387
PCT Pub. Date: Jun. 26, 2008

(65) Prior Publication Data
US 2010/0140301 A1    Jun. 10, 2010

Related U.S. Application Data

(60) Provisional application No. 60/875,210, filed on Dec. 15, 2006.

(51) Int. Cl.
*G06F 11/10* (2006.01)
(52) U.S. Cl. .................. 222/370; 222/333; 222/636
(58) Field of Classification Search ............ 222/630, 222/636, 195, 237, 240, 242, 235, 637, 367–368, 222/370, 333; 406/63, 66–67
See application file for complete search history.

(56) References Cited

U.S. PATENT DOCUMENTS

| 3,556,355 | A | * | 1/1971 | Ruiz .......................... 222/368 |
| 3,779,712 | A | | 12/1973 | Calvert et al. ............... 422/219 |
| 3,876,602 | A | | 4/1975 | Calvert et al. ................. 526/86 |
| 4,716,062 | A | | 12/1987 | Klein ........................ 428/515 |
| 5,209,607 | A | * | 5/1993 | Wei et al. ..................... 406/66 |
| 5,356,599 | A | * | 10/1994 | Miura et al. ................ 422/219 |
| 6,651,843 | B2 | * | 11/2003 | Kowalsky et al. .............. 222/1 |
| 7,090,098 | B2 | | 8/2006 | Livingston et al. .......... 222/651 |

FOREIGN PATENT DOCUMENTS

| DE | 19500726 | 7/1998 |
| EP | 0232922 | 6/1989 |
| GB | 1295459 | 11/1972 |
| JP | 09013005 | 1/1997 |
| WO | WO 02/096643 | 12/2002 |

OTHER PUBLICATIONS

Abstract of JP 09013005, published Jan. 14, 1997.
Abstract of WO 2002/096643, published Dec. 5, 2002.

* cited by examiner

*Primary Examiner*—Frederick C. Nicolas (57) ABSTRACT

An apparatus for feeding a dry particulate solid into a pressurized vessel including: a solids reservoir; a rotating metering disc below the solids reservoir; a non-rotating component adjacent to the metering disc; a surface of contact between the metering disc and the non-rotating component, wherein the surface of contact comprises a low friction material; a drive shaft, a drive motor; a pickup section; and an injection tube is provided.

21 Claims, 5 Drawing Sheets

PARTICULATE SOLIDS INJECTOR

CROSS-REFERENCE TO RELATED APPLICATIONS

This application is a National Stage application under 36 U.S.C. §371 of International Application No. PCT/US2007/025679, filed Dec. 12, 2007, that claims the benefit of Ser. No. 60/875,210, filed Dec. 15, 2006, the disclosures of which are incorporated by reference in their entireties.

FIELD OF THE INVENTION

This disclosure relates generally to an apparatus and method for injecting particulate solids into a pressurized vessel and more particularly to an apparatus and method for continuously injecting particulate solid catalyst materials into a reaction vessel. The invention also relates to an improved novel injection device for feeding catalyst materials into a reaction vessel.

BACKGROUND OF THE INVENTION

One method for the manufacture of a polyolefin polymer uses a gas phase fluidized bed process. In the gas phase process, a catalyst used to react monomers to polymers is commonly a dry particulate (finely divided), solid catalyst. Typically, the finely divided solid catalyst is fed into a reaction vessel whereby gaseous monomers polymerize. Ideally, the catalyst should be introduced continuously in order to maintain steady state conditions in the reaction zone.

Figure 1:
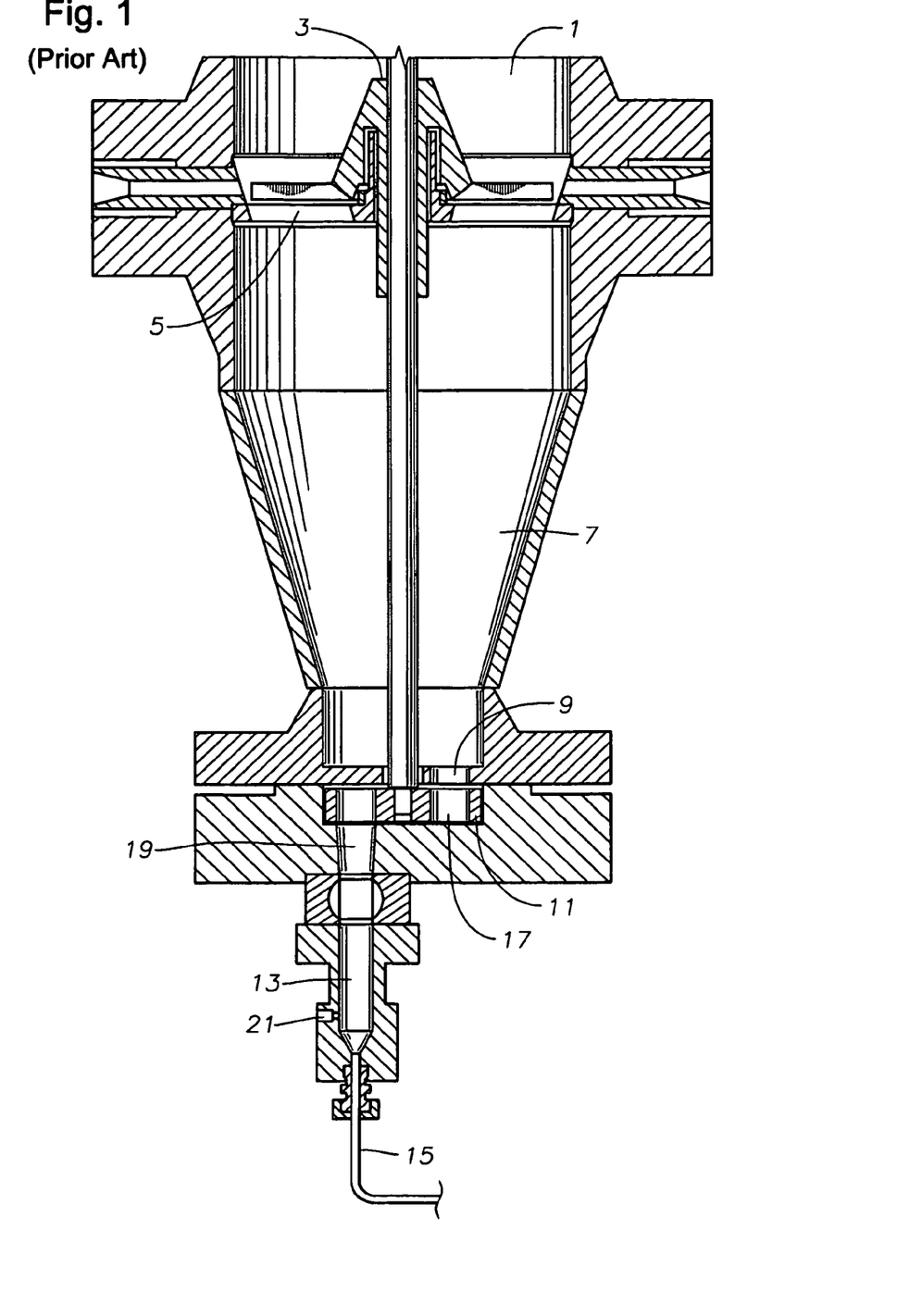
FIG. 1 is a cross sectional drawing of a solids feeder of the prior art reproduced from U.S. Pat. No. 3,779,712.

One method and device for feeding finely divided solid catalyst into a polymerization reactor is described in U.S. Pat. Nos. 3,779,712 and 3,876,602. Referring to prior art FIG. 1, these patents describe a catalyst feeder device comprising a solids reservoir 1, an agitator 3, a screen 5, a lower casing section 7, a port 9, a metering disc 11, a pickup block or entrainment chamber 13, an injection or capillary tube 15, and other details of the device. Using this device, a discrete amount of catalyst is transported into a plurality of cavities 17 in the metering disc 11 as each of the cavities 17 are exposed to catalyst in the lower casing section 7. As the metering disc rotates, the catalyst in each of the cavities 17 drops into the entrainment chamber 13 as each cavity 17 aligns with the inlet 19. A carrier gas is continuously fed into the pickup block 13 through a tangential entrance port 21. The carrier gas then carriers the catalyst through the injection or capillary tube 15 into the polymerization reactor.

Figure 2:
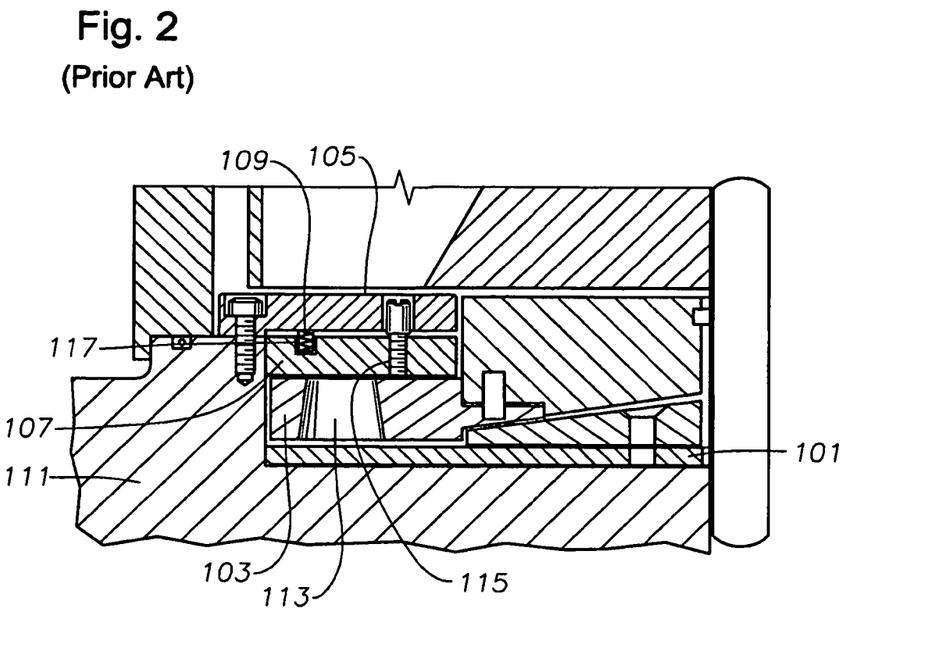
FIG. 2 is a cross sectional drawing blow-up of the metering section of a solids feeder.

Referring to prior art FIG. 2, improvements to the device described above include the additional of a cover plate assembly and wear plate 101 to provide better sealing on each side of the metering disc 103 and assure proper isolation of the pickup section (not shown) from the rest of the feeder. The cover plate assembly comprises a cover plate 105, a floating cover plate 107, and a plurality of springs 109 located between the cover plate 105 and floating cover plate 107. The cover plate 107 is bolted to the bottom forging or bottom flange 111 of the catalyst feeder. The floating cover plate 107 rests on top of the metering disc 103. The springs 109 push the floating cover plate 107 down on the metering disc 103 to effect a good seal between the catalyst chamber above and a plurality of cavities 113 in the metering disk 103.

The floating cover plate 107 typically has a layer of polyurethane glued to it on the side contacting the metering disc 103. This layer of polyurethane helps provide a seal to the top of the metering disc 103 and provides a wearing surface that will not damage the metering disc 103. The floating cover plate 107 is assembled to the cover plate 105 and is held loosely in position by two guide pins 115. This allows the floating cover plate 107 to move freely but still maintain a constant pressure on the metering disc 103.

With reference to FIG. 2, the wear plate 101 is located below the metering disc 103. The purpose of the wear plate 101 is to provide a bearing surface for the metering disc 103. The disc contact side of the wear plate 101 is typically covered with a sealing material, wherein the sealing material is typically polyurethane. The wear plate 101 is typically secured to the bottom forging or bottom flange 111 of the feeder and provides a surface for sealing the cavities in the metering disc 103 from the pickup section. This seal, in conjunction with the floating cover plate 107 prevents fine solids, such as dry catalyst powder from free flowing into the reactor.

Dry particulate catalyst feeders are typically operated at low rotation speeds. The catalyst feeder disc is rotated by a variable speed motor, typically, for example, a 0 to 1800 rpm high torque motor, through a gearbox with a turndown ratio, for example, of 900:1 to 1500:1. Rotating the metering disc at low speed may result in overheating of the motor, or stalling the motor due to the high torque required at the low rotation speed. Thus, minimum motor speeds, for example, of about 200 rpm are typically required in order to provide the torque required to turn the metering disc without overheating or stalling the motor. This means the metering disc typically rotates, for example, at a speed of about 0.13 to about 2 rpm, with about 0.13 rpm being a minimum rotation speed.

The dry particulate catalyst feeders described above are used to feed a large variety of catalyst systems. Any catalyst made in dry power form can typically be fed to the reaction system using a dry particulate catalyst feeder. The amount of catalyst fed is dependent on the volume and number of cavities in the metering disc and the speed the metering disc turns. Typically, a metering disc is selected with the proper volume and number of cavities to provide the desired catalyst feed rate over the range of rotation speeds of the metering disc. Changing the speed the metering disc rotates is then used to control the catalyst feed rate and ultimately the production rate of the polymerization reaction. Ideally, one size metering disc is used to feed all catalysts. However, with the development of modern high activity catalyst and the development of high capacity reaction systems with high turn-down ratios, it is becoming more difficult to provide a catalyst feeder that can feed enough catalyst at the highest rates on the lowest productivity catalyst and still feed the small amount of a high productivity catalyst required at a low or start-up production rate.

Due to the combination of high activity catalyst and minimum rotation speed requirements of the catalyst feeder, the turndown ratio of a reaction system may be limited. Furthermore, a catalyst feeder may have problems when attempting to feed a small amount of catalyst during a reactor start-up. To help increase the range of the volume of catalyst that can be fed, dual pickup sections may be installed on a single catalyst feeder. When one pickup section is isolated by a valve, that pickup section does not feed catalyst, giving the feeder half of the feed capacity as compared to when both pickup sections are in service. However, providing a broad range of catalyst injection rates remains a problem in the industry. Other background reference include U.S. Pat. No. 5,209,607, GB 1 295, 459, DE 195 00 726 A1, WO 02/096643, JP 09 013005, and EP 0 232 922 A.

Accordingly, there exists a need to provide a solids feeder with the ability to operate at lower rotation speeds without stalling or damaging drive motors. It is further desirable to lower the torque required to turn the solids feeder disc, which in turn will lower the torque that the drive motor must produce to turn the solids feeder disc.

SUMMARY OF THE INVENTION

In a class of embodiments, the invention provides a solids feeder with low turning torque at low speeds that can operate at low rotations speeds without stalling or overheating the feeder drive motor. The invention also provides for an apparatus for feeding a dry particulate solid into a pressurized vessel comprising: a reservoir for holding a dry particulate solid; a metering disc below the solids reservoir, wherein the metering disc rotates; a non-rotating component adjacent to the metering disc; a surface of contact between the metering disc and the non-rotating component, wherein the surface of contact comprises a low friction material; a drive shaft, wherein the drive shaft rotates the metering disc; a drive motor for rotating the drive shaft; a pickup section; and an injection tube.

In any of the embodiments described herein, a static coefficient of friction against polished steel of the low friction material is less than about 0.05.

In one class of embodiments, the low friction material comprises a polytetrafluoroethylene (PTFE). The PTFE may comprise fillers of glass fibers, carbon, graphite, molybdenum disulphide, ceramic, or aramid fiber (for example, Kevlar™). In another embodiment, the PTFE is a glass-filled PTFE comprising at least 15 wt % or more glass-fill, based upon the total weight of the low friction material. In yet another embodiment, the PTFE is a glass-filled PTFE comprising at least 25% or more glass-fill, based upon the total weight of the low friction material. In still another embodiment, the polytetrafluoroethylene comprises fillers of carbon, graphite, molybdenum disulphide, ceramic, or aramid fiber.

In other embodiments wherein the low friction material comprises a PTFE with at least 25% or more glass-fill, based upon the total weight of the low friction material, the surface of contact is a surface of the non-rotating component, the metering disc, or a combination thereof.

In one embodiment wherein the low friction material comprises a PTFE comprising at least 25% or more glass-fill, based upon the total weight of the low friction material, and the surface of contact is a surface of the non-rotating component, the non-rotating component is a floating cover plate, wear plate, or combination thereof.

In yet another embodiment wherein a non-rotating component is a floating cover plate, the floating cover plate is a metal floating cover plate with glass-filled PTFE comprising at least 25% or more glass fill, based upon the total weight of the low friction material, bonded to a side of the metal floating cover plate.

In another embodiment wherein a non-rotating component is a floating cover plate, the floating cover plate is a solid piece of glass-filled PTFE comprising at least 25% or more glass fill, based upon the total weight of the low friction material.

In yet another embodiment wherein a non-rotating component is a wear plate, the wear plate is a metal wear plate with glass-filled PTFE comprising at least 25% or more glass fill bonded to a contact side of the metal wear plate, based upon the total weight of the low friction material.

In still another embodiment wherein a non-rotating component is a wear plate, the wear plate is a solid piece of glass-filled PTFE comprising at least 25% or more glass fill, based upon the total weight of the low friction material.

Another embodiment wherein the surface of contact of the non-rotating component comprises glass-filled PTFE comprising at least 25% or more glass fill, based upon the total weight of the low friction material, and the non-rotating component is a floating cover plate, wear plate, or combination thereof, the invention further comprises a cover plate and a plurality of springs, wherein the cover plate is located above the floating cover plate and the plurality of springs contact the cover plate and the floating cover plate, and wherein the plurality of springs exert less than 5 lbs/in$^2$ (0.35 kg.cm$^2$) of force on the metering disc.

In another embodiment, the polytetrafluoroethylene comprises fillers of carbon, graphite, molybdenum disulphide, ceramic, or aramid fiber, the non-rotating component is a floating cover plate, and the floating cover plate is a solid piece of polytetrafluoroethylene.

In yet another embodiment, the polytetrafluoroethylene comprises fillers of carbon, graphite, molybdenum disulphide, ceramic, or aramid fiber, the non-rotating component is a wear plate, and the wear plate is a solid piece of polytetrafluoroethylene.

In another embodiment, the non-rotating component is a wear plate, and the wear plate is a solid piece of PTFE.

In yet another embodiment, the non-rotating component is a floating cover plate, and the floating cover plate is a solid piece of polytetrafluoroethylene.

In still another embodiment, the non-rotating component is a wear plate, and the wear plate is a solid piece of glass-filled PTFE.

In yet another embodiment, the non-rotating component is a floating cover plate, and the floating cover plate is a solid piece of glass-filled polytetrafluoroethylene.

In any of the embodiments described herein, a torque required to rotate the drive shaft of the solids feeder is about 55 ft-lbs (74.6 N-m) or less.

In any of the embodiments described herein, the torque required to rotate the drive shaft of the solids feeder is about 20 ft-lbs (27.1 N-m) or less.

In any of the embodiments described herein, the drive shaft rotates at a speed of less than 0.13 rpm without stalling the drive motor.

Other features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

In a class of embodiments, the invention provides for a solids feeder with the ability to operate at lower rotation speeds without stalling or damaging drive motors because components in moving contact with one another are provided with a surface comprising a low friction material, such as, for example, glass-filled polytetrafluoroethylene (PTFE), to reduce the friction between the surfaces. By using low friction material in locations where there is moving contact, the torque required to turn the metering disc in the solids feeder, is reduced. Furthermore, by limiting the force exerted by the springs pushing moving and non-moving parts together, the torque required to turn the solids feeder is also reduced.

Figure 3:
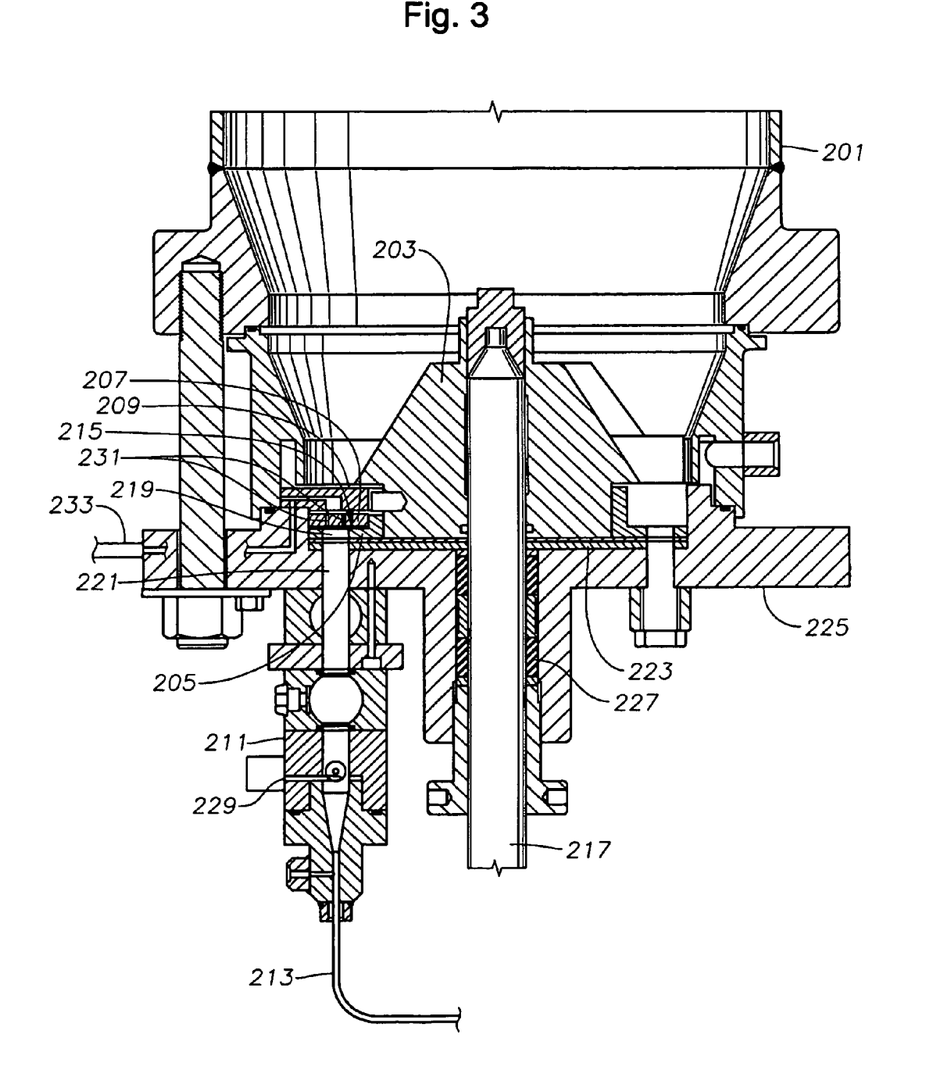
FIG. 3 is a cross sectional drawing of a solids feeder showing the lower section of a solids feeder with a low friction material on the surfaces of contact.

Referring to FIG. 3, embodiments of a device for feeding finely divided solid catalyst into a polymerization reactor may comprise a solids reservoir 201, an agitator (also called a fluffer) 203, a screen in the solids reservoir (not shown), a metering disc 205, a floating cover pate 207, a cover pate 209, a pickup block 211, and an injection tube 213. The feeder may comprise other parts. as required (see, for example, U.S. Pat. Nos. 3,779,712 and 3,876,602).

One class of embodiments provides for an apparatus for feeding a dry particulate solid into a pressurized vessel. Referring to FIG. 3, the apparatus comprises: a solids reservoir 201 for holding a dry particulate solid; a metering disc 205 below the solids reservoir 201, wherein the metering disc 205 rotates; a non-rotating component adjacent to the metering disc 205; a surface of contact 215 between the metering disc 205 and the non-rotating component, wherein the surface of contact 215 comprises a low friction material; a drive shaft 217, wherein the drive shaft 217 rotates the metering disc 205; a drive motor (not shown) for rotating the drive shaft 217; a pickup section 211; and an injection tube 213. In one embodiment, the metering disk 205 is driven by a fluffer 203.

A low friction material, as used herein, is a non-metallic material, for example a polymer, that has a relatively low coefficient of static friction, for example, a static coefficient of friction against polished steel of less than about 0.25. The coefficient of friction may be measured by various methods, for example, as described in ASTM D3702. The low friction material may be any low friction material that is compatible with the process of interest and has the desired mechanical properties for the contacting component to be made of or coated with the low frictional material. The surface of contact may be the same material as the contacting component, may be a material bonded to the contacting component, or may be a coating applied to the contacting component. As used herein, the contacting component may be the metering disc or a non-rotating component or non-rotating components. In one embodiment, the low friction material has a static coefficient of friction against polished steel of less than about 0.13. In another embodiment, the low friction material has a static coefficient of friction against polished steel of less than about 0.05. In one class of embodiments, the low friction material comprises PTFE. In another class of embodiments, the low friction material comprises PTFE with fillers of glass fibers, carbon, graphite, molybdenum disulphide, ceramic, or aramid fiber. In still yet another class of embodiments, the low friction material comprises PTFE comprising fillers of carbon, graphite, molybdenum disulphide, ceramic, or aramid fiber. In still another class of embodiments, the low friction material comprises PTFE comprising at least 15% or more glass-fill, and more preferably PTFE comprising at least 25% or more glass-fill.

The dry particulate solid may be any solid material that is dry, free flowing, and capable of feeding through the solids feeder without sticking to or damaging the internal parts. The dry particulate solid may be a finely divided solid material. The term "finely divided solid material" as employed herein refers to a particulate solid material with particle sizes ranging from about 5 to about 60 microns. In one embodiment, the dry particulate solid is a catalyst, generally in free-flowing particulate form. The catalyst may be supported on a carrier, such as, for example, silica, or unsupported catalyst, such as, for example, ground or spray-dried particles.

The solids reservoir 201 of the solids feeder is the upper portion of the solids feeder where the solid material may be held under pressure. The solids reservoir 201 may be any size and pressure rating suitable for the application on interest. The solids reservoir 201 preferably has connections for charging the catalyst, vent connections, filters for venting the solids reservoir 201, and connections for instrumentation, such as pressure and pressure differential instruments.

Still referring to FIG. 3, the metering disc 205 is located below the solids reservoir 201 in the metering section of the solids feeder. Solids from the solids reservoir 201 above are in contact with the metering disc 205 at certain points in the rotation of the metering disc 205. In any of the embodiments, the metering disc 205 may be a two-piece design to facilitate resurfacing. The two-piece metering disc comprises a metering disc 205 that is driven by the fluffer 203 which in turn is driven by the drive shaft 217. The metering disc 205 has a plurality of cavities 219 in the disc that receive solids from the solids reservoir 201 above. The number of cavities, volume of the cavities, and rotational speed of the drive shaft 217 determines the solids feed rate through the solids feeder. In any embodiment, the plurality of cavities 219 may be partially shielded by at least one floating cover plate 207. The cavities fill with catalyst when they are not shielded by the floating cover plate 207 and then empty through the pickup section inlet 221, located below the metering disc 205, when they are shielded by the floating cover plate 207. Different disc thicknesses, cavity sizes, and number of cavities may be used to vary the metering disc 205 volumetric capacity. The bottom of the metering disc 205 may contain pumping groves (not shown) to prevent very fine particles from accumulating under the metering disc 205. Similar grooves may be used around the outside diameter to keep the solids from packing around the outside of the metering disc 205. In one class of embodiments, the metering disc 205 is made of metal, for example, a non-rusting metal such as stainless steel. In one embodiment, the metering disc 205 may be coated with the low friction material. In yet another embodiment, the metering disc 205 may be made entirely of the low friction material.

In an alternative class of embodiments, the metering disc 205 may be fabricated from in whole or part from a material comprising a thermoplastic resin. Thermoplastic resins or polymers suitable for use in the present invention include any one or more of amorphous, partially crystalline or essentially totally crystalline polymers selected from polyolefins, polyamides, polyimides, polyesters, polycarbonates, polysulfones, polylactones, polyacetals, acrylonitrile/butadiene/styrene copolymer resins, polyphenylene oxides, ethylene-carbon monoxide copolymers, polyphenylene sulfides, polystyrene, styrene/acrylonitrile copolymer resins, styrene/maleic anhydride copolymer resins, aromatic polyketones and mixtures thereof.

In a class of embodiments, thermoplastic resins include at least partially crystalline polyolefin homopolymers and copolymers, including polymers prepared using Ziegler/Natta type catalysts or metallocene catalysts. They are desirably prepared from monoolefin monomers having 2 to 6 carbon atoms, such as ethylene, propylene, 1-butene, isobutylene, 1-pentene, copolymers containing these monomers, and the like, with propylene being the preferred monomer. The term polypropylene includes homopolymers of propylene as well as reactor copolymers of propylene which can contain 1 to 20 wt % of ethylene or an alpha-olefin comonomer of 4 to 16 carbon atoms or mixtures thereof. The polypropylene can be highly crystalline isotactic or syndiotactic polypropylene, usually having a narrow range of glass transition temperature (Tg).

Other suitable materials include polyamides (such as nylons), crystalline or resinous, high molecular weight solid polymers including copolymers and terpolymers having recurring amide units within the polymer chain. Polyamides may be prepared by polymerization of one or more epsilon lactams such as caprolactam, pyrolidione, lauryllactam and aminoundecanoic lactam, or amino acid, or by condensation of dibasic acids and diamines. Both fiber-forming and molding grade nylons are suitable. Examples of such polyamides are polycaprolactam (nylon 6), polylauryllactam (nylon 12), polyhexamethyleneadipamide(nylon-6,6), polyhexamethyleneazelamide (nylon-6,9), polyhexamethylenesebacamide (nylon 6,10), polyhexamethyleneisophthalamide(nylon-6, IP) and the condensation product of 11-amino-undecanoic acid (nylon 11).

In yet other embodiments, suitable materials include polyesters. They include without limitation the polymer reaction products of one or a mixture of aliphatic or aromatic polycarboxylic acids esters of anhydrides and one or a mixture of diols. Examples of satisfactory polyesters include poly (trans-1,4-cyclohexylene C2-6 alkane dicarboxylates such as poly(trans-1,4-cyclohexylene succinate) and poly(trans-1,4-cyclohexylene adipate); poly(cis or trans-1,4-cyclohexanedimethylene)alkanedicarboxylates such as poly(cis 1,4-cyclohexane-di-methylene)oxlate and poly-(cis 1,4-cyclohexane-di-methylene)succinate, poly(C2-4 alkylene terephthalates) such as polyethyleneterephthalate and polytetramethyleneterephthalate, poly(C2-4 alkylene isophthalates such as polyethyleneisophthalate and polytetramethylene-isophthalate and like materials. Preferred polyester are derived from aromatic dicarboxylic acids such as naphthalenic or ophthalmic acids and C2 to C4 diols, such as polyethylene terephthalate and polybutylene terephthalate.

Poly(phenylene ether) (PPE) thermoplastic engineering resins may also be used in yet other embodiments.

Suitable commercial materials include, for example, DELRIN, any one or combination of nylons (extruded and/or glass filled), PEEK (PolyEtherEther Ketone), TORLON, and combinations thereof.

Referring to FIG. 3, the solids feeder comprises a non-rotating component adjacent to the metering disc 205. As used herein, the non-rotating component may be any part, plurality of parts, or combination of a plurality of parts, of the solids feeder that does not rotate. In one class of embodiments, the non-rotating component has a surface in contact with the metering disc 205. In one embodiment, the non-rotating component is a floating cover plate 207, a wear plate 223, or a combination thereof.

Still referring to FIG. 3, in a class of embodiments, the invention also comprises a surface of contact 215 between the metering disc 205 and the non-rotating component. The surface of contact 215 is a surface, or surfaces, where the metering disc 205 and non-rotating component are in contact. Thus, as used herein, a surface of contact 215 may be any surface of the metering disc 205 or of a non-rotating component where the metering disc 205 and the non-rotating component touch.

The metering disc 205 and the non-rotating component, or non-rotating components, are thus in moving or sliding contact.

Still referring to FIG. 3, the drive shaft 217, may enter the solids feeder through the bottom of the feeder by passing through the bottom flange 225. The drive shaft 217 may be fitted with a shaft seal 227 appropriate for the pressure in the solids reservoir 201. The drive shaft 217 may be equipped with a shear pin to protect the solids feeder from damage in the event of drive a shaft seizure.

The solids feeder is typically driven by a motor, which may be an electric motor. In any of the embodiments, the motor may be a ½ to ¾ Hp. In any other embodiments, the motor may be an 1800 rpm motor with electronic speed control.

Still referring to FIG. 3, the pickup section 211, also referred to as a solids entrainment section, is below the bottom flange 225 of the solids feeder. A passage through the bottom flange 225, referred to herein as the pickup section inlet 221 allows solids to fall from the plurality of cavities 219 in the metering disc 205 into the pickup section 211 as each cavity aligns above the pickup section inlet 221. The pickup section 211 combines the solids with a carrier gas flow that enters the pickup section 211 through a tangential port 229 in the pickup section 211. The swirling carrier gas then transports the solid particles into a pressurized vessel, preferably a polymerization reactor, and more preferably a gas phase fluidized bed polymerization reactor, through an injection tube 213. The injection tube 213 is typically a small diameter tube, and may have an inner diameter of about 0.10 and about 0.25 inches (2.5 to 6.35 mm).

Referring to FIG. 3, in one embodiment, the cover plate 209 further comprises a pocket nitrogen outlet 231. Pocket nitrogen is a flow of inert gas, preferably nitrogen, that enters the solids feeder through a port 233 in the bottom flange 225, and exits in the solid feeder at a point in alignment with the pickup section inlet port 221. Thus, the inert gas flows into each of the plurality of cavities 219 in the metering disc 205 as each cavity passes over the pickup section inlet port 221. The pocket nitrogen flow dislodges any solid material that does not fall freely from the metering disc 205 as each cavity passes over the pickup section inlet 221. The pocket nitrogen flow exits the cover pate 209 through the pocket nitrogen outlet 231. The pocket nitrogen outlet 231 extends through a hole through the floating cover plate 207.

In another class of embodiments, for larger scale operations, the metering disc 205 in FIG. 3 may be increased to as much as 1.375" or more. Accordingly, a skilled artisan would recognize the following would be expected to change as well to accommodate for the added thickness: fixed Cover Plate 209, fluffer 203, and the vessel center section not shown.

Alternatively, for other larger scale operations, in another class of embodiments, the hole diameter of the cavities 219 of the metering disc 205 in FIG. 3 may be increased to provide for a volume feed rate of at least 32 cubic inches per revolution. Accordingly, as a skilled artisan would recognize the following parts are expected to change as well to accommodate for the increased diameter: lower flange 225, wear plate 223, metering disc 205, floating cover plate 207, and the fixed cover plate 209.

Referring back to FIG. 2, a plurality of springs 109 are located in pockets 117 in the floating cover plate 107, and are in contact with the floating cover plate 107 and the cover plate 105. The springs are compressed as the cover plate 105 is bolted in place. The plurality of springs 109 provide a sealing force by pushing the floating cover plate 107 down onto the metering disc. In one embodiment, the plurality of springs may exert a force of less than about 5 lbs/in² (0.35 kg/cm²) of sealing force to the metering disc.

Figure 4:
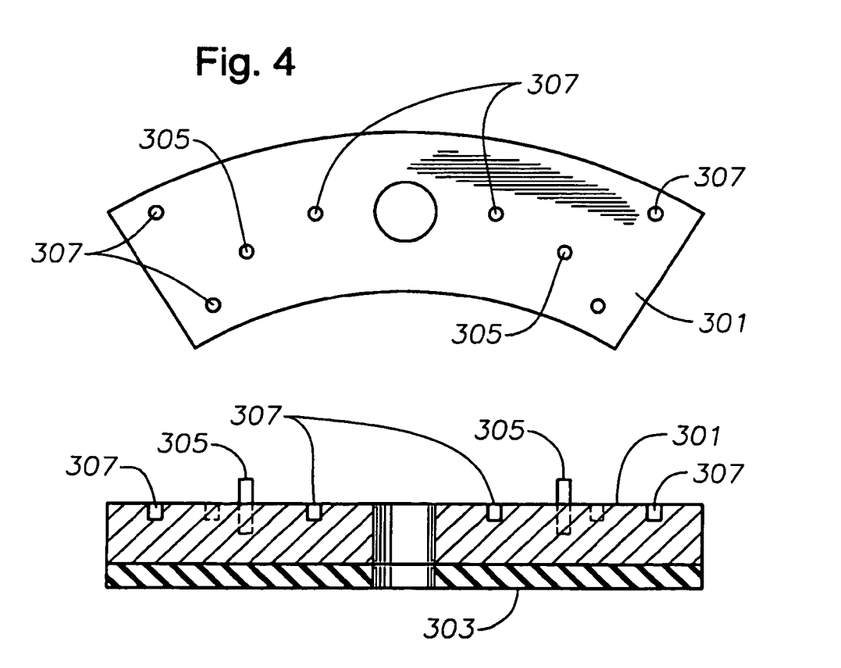
FIG. 4 is a plan and cross sectional view of a floating cover plate.

Now referring to FIG. 4, in a class of embodiments, the current invention may utilize various types of floating cover plates 301. In one class of embodiments, the floating cover plate 301 is a metal floating cover plate with a low friction material bonded to a surface of a metal floating cover plate. The low friction material is typically bonded to the bottom side of the floating cover plate, which is the surface of contact 303 with the top of the metering disc when installed. In one class of embodiments, the low friction material is a glass filled PTFE, which bonded to the metal cover plate using a 3M #90 High Strength Aerosol glue. The glass filled PTFE may be etched to promote bonding of the glass filled PTFE to metal surfaces. In another class of embodiments, the floating cover plate 301 is made from a solid piece of low friction material, for example: a solid piece of PTFE with a filler; a solid piece of PTFE comprising at least about 15% or more glass fill; or a solid piece of PTFE comprising at least about 25% or more glass fill. As used herein a "solid piece" refers to a piece of predominantly one substance or character.

In yet other embodiments, the low friction material may be a filled, such as a glass filled piece of PTFE.

Several embodiments of suitable materials may be available from Sasol Chemical, Johannesburg, South Africa.

Still referring to FIG. 4, a floating cover plate 301 may be held in position below the cover plate by a plurality of pins 305. The cover plate is attached to the bottom flange of the solids feeder, providing a fixed base for the floating cover plate 301. The plurality of pins 305, are attached to the floating cover plate 301 and extend into guide holes in the cover plate to keep the floating cover plate 301 in position. Furthermore, the floating cover plate 301 may have a plurality of pockets 307 to contain the plurality of springs discussed above.

Figure 5:
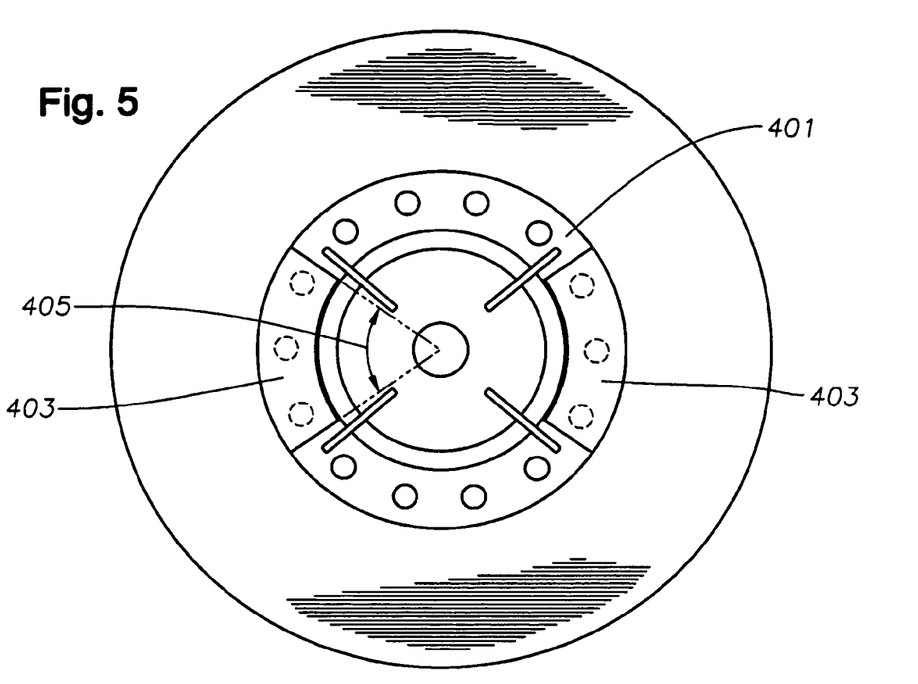
FIG. 5 is a plan view of a floating cover plate installed above the metering disc.

Referring to FIG. 5, looking down at the metering disk 401, the floating cover plate 403 covers only a portion of the metering disc 401. In any of the embodiments, the floating cover plate 403 may cover an angle 405 of less than about 90 degrees of the metering disk 401, and may cover an angle 405 of about 60 degrees of the metering disc 401.

Figure 6:
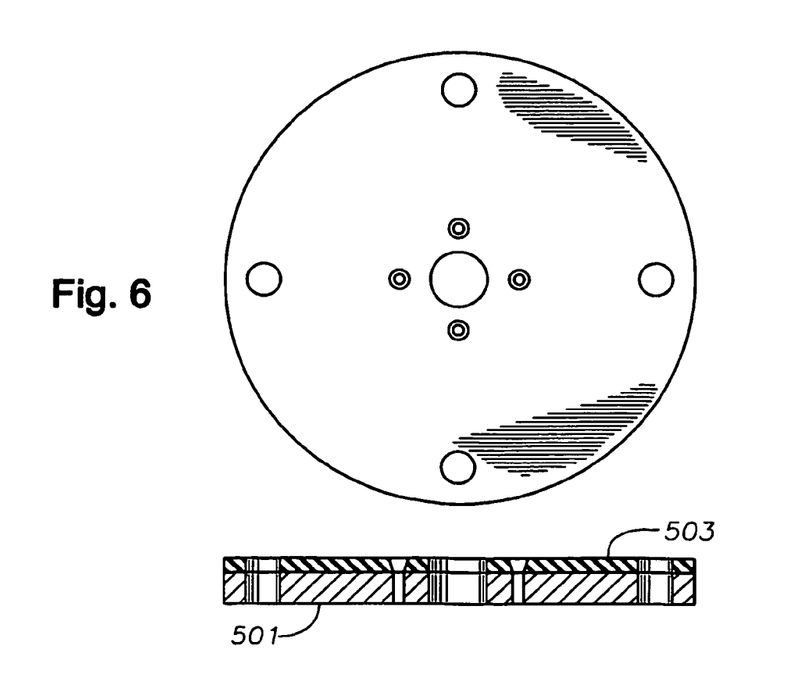
FIG. 6 is a plan and cross sectional view of a wear plate.

As described above, the wear plate is a non-rotating component located below the metering disc. Referring now to FIG. 6, in any embodiment, the wear plate 501 may be a metal plate with a low friction material bonded to one side to provide the surface of contact 503 with the metering disc. In other embodiments, the wear plate 501 may be a solid piece of low frictional material, such as, for example, glass-filled PTFE.

By providing a surface of contact between the metering disc and a non-rotating component(s) that comprises a low friction material, the torque required to turn the solids feeder may be reduced. In any of the embodiments, a torque required rotate the drive shaft may be less than about 55 ft-lbs (74.6 N-m), and may further be less than about 20 ft-lbs (27.1 N-m). Furthermore, by providing a solids feeder with less torque requirements, the solids feeder drive shaft speed, and thus the rotational speed of the metering disc, may be reduced to less than 0.13 rpm without stalling or over-heating the drive motor.

Any of the embodiments may further comprise features such as a hydraulic assembly to lower the bottom flange from the solids reservoir, screens above the metering section (for example, 12, 16, or 20 mesh screens or a combination thereof), brushes above the screens, a fluffer above the metering disk and below the screens, solids vacuuming ports, or other features known to one of skill in the art. Various piping arrangements may be used to pressurize, vent, and vacuum the solids feeder.

Figure 7:
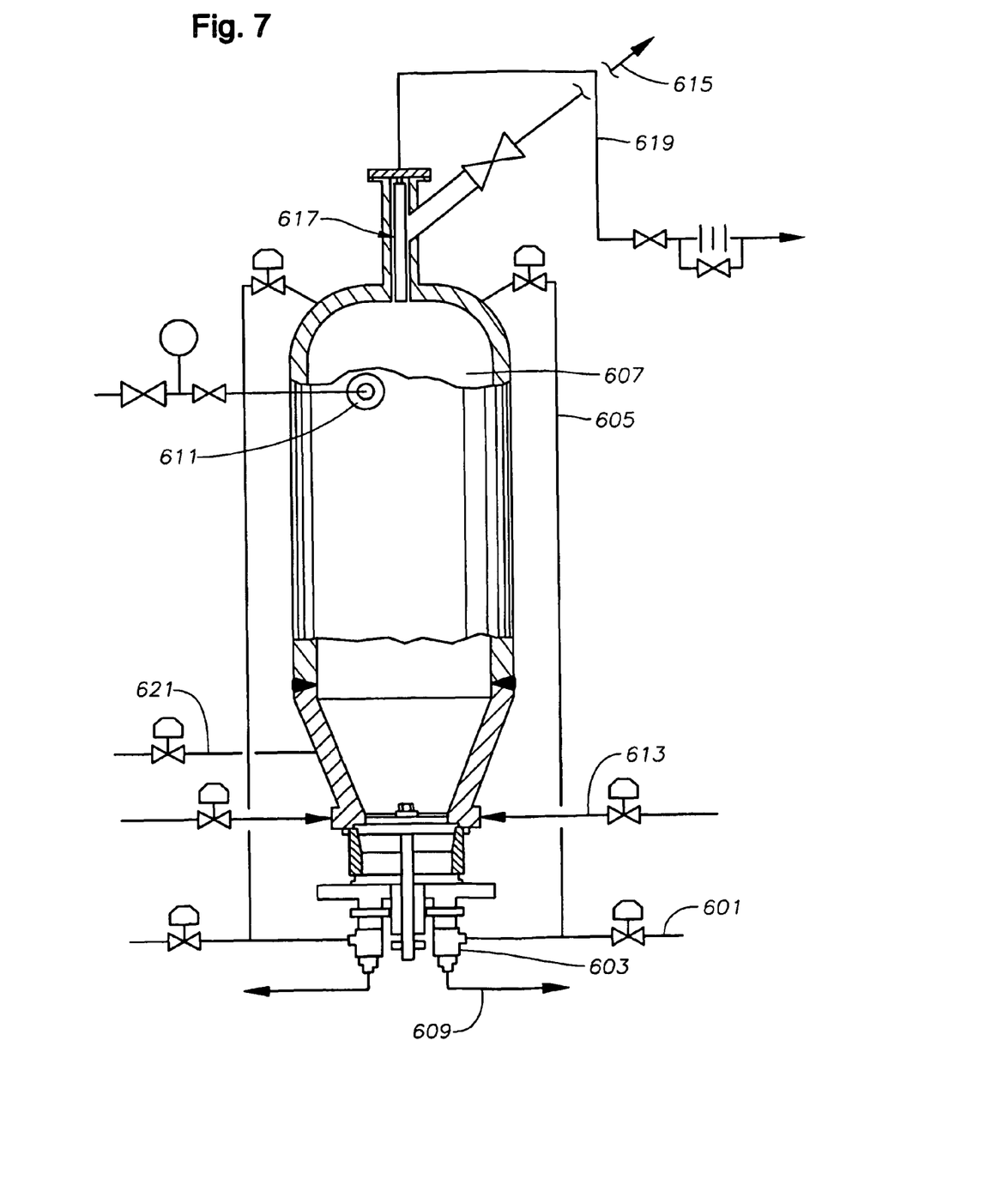
FIG. 7 is a schematic of a solids feeder showing attached piping.

Referring to FIG. 7, a carrier gas supply conduit 601 is connected to the tangential port of the pickup section 603. In one embodiment, an equalizing line 605 provides a fluid connection between the carrier gas supply conduit 601 and the solids reservoir 607 to substantially equalize the pressure between the two locations during solids feeder operation. By substantially equalizing the pressure between the solids reservoir 607 and the carrier gas supply conduit 601, the pressure between the solids reservoir 607 and the pickup section 603 is reduced, and thus the pressure differential across the metering disk is reduced, which helps to minimize force feeding. The solids are transported from the pickup section 603, to the downstream vessel, for example, a polymerization vessel, through the injection tube 609. In another embodiment, a tangential charge line 611 is provided to transport solids into the solids reservoir 607. The solids feeder may further comprise a dumping system comprising a blowing line 613, and vacuum line 615 to completely remove all solids from the feeder. A solids feeder may also have a vent filter 617, and a vent line 619 to allow the feeder to be depressurized. The solids feeder may also have other lines, such as an oxidizing gas supply line 621 connected to the reservoir to deactivate or oxidized residual solids left in the feeder before opening the feeder for maintenance.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments, those skilled in the art, having benefit of this disclosure, will appreciate that other embodiments can be devised which do not depart from the scope and spirit of the invention as disclosed herein.

What is claimed is:

1. An apparatus, the apparatus comprising:
   (a) a solids reservoir for holding a dry particulate solid;
   (b) a metering disc below the solids reservoir, wherein the metering disc rotates;
   (c) a first and second non-rotating component adjacent to the metering disc, wherein the first non-rotating component is below the metering disc and comprises a wear plate and wherein the second non-rotating component is above the metering disc and comprises a floating cover plate;
   (d) a cover plate and a plurality of springs, wherein the cover plate is located above the floating cover plate and the plurality of springs contact the cover plate and the floating cover plate
   (e) a surface of contact between the metering disc and at least one of the non-rotating components, wherein the surface of contact comprises a low friction material, wherein the low friction material comprises polytetrafluoroethylene and glass fibers, fillers of carbon, graphite, molybdenum disulphide, ceramic, or aramid fiber;
   (f) a drive shaft, wherein the drive shaft rotates the metering disc;
   (g) a drive motor for rotating the drive shaft;
   (h) a pickup section; and
   (i) an injection tube.

2. The apparatus of claim 1, wherein the polytetrafluoroethylene is a glass-filled polytetrafluoroethylene comprising at least 15 wt % or more glass-fill or at least 25 wt % or more glass fill, based upon the total weight of the low friction material.

3. The apparatus of claim 1, wherein the surface of contact is a surface of the first or second non-rotating component, the metering disc, or a combination thereof.

4. The apparatus of claim 1, wherein the plurality of springs exert less than 0.35 kgs/cm$^2$ of force on the metering disc.

5. The apparatus of claim 1, wherein the wear plate or floating cover plate is a solid piece of polytetrafluoroethylene.

6. The apparatus of claim 1, wherein the floating cover plate or the wear plate is a metal floating cover plate or wear plate with glass-filled polytetrafluoroethylene bonded to a side of the metal floating cover plate.

7. The apparatus of claim 1, wherein a torque required to rotate the drive shaft is less than about 74.6 N-m.

8. The apparatus of claim 1, wherein the torque required is less than about 27.1 N-m.

9. The apparatus of claim 1, wherein the drive shaft rotates at a speed of less than 0.13 rpm without stalling the drive motor.

10. The apparatus of claim 1, wherein a static coefficient of friction against polished steel of the low friction material is less than about 0.05.

11. An apparatus comprising:
    a reservoir, the reservoir having an interior volume;
    a barrier located below the reservoir, the barrier being mated to the reservoir and having at least one passageway therethrough;
    a drive shaft extending through an opening in the barrier;
    a lower sealing surface mated to the top of the barrier such that the lower sealing surface does not rotate, the lower sealing surface having at least one passageway therethrough aligned with the at least one barrier passageway;
    an upper sealing surface support anchored to the barrier such that the upper sealing surface support is fixed;
    an upper sealing surface engaged with the upper sealing surface support such that the upper sealing surface does not rotate, wherein there is a plurality of springs between the upper sealing surface support and the upper sealing surface;
    a metering device attached directly or indirectly to the drive shaft, the bottom of the metering device being in contact with the lower sealing surface and the top of the metering device being in contact with the upper sealing surface such that the at least one barrier passageway is substantially isolated from the reservoir interior, and the metering device containing at least one passageway therethrough, wherein when the metering device is rotated by the drive shaft at least one of the metering device passageways is open to the reservoir interior volume at a first time, and the at least one metering device passageway is aligned with the at least one barrier passageway at a second time;
    a receiving chamber attached to each of the barrier passageways; and
    an injection tube in fluid communication with the receiving chamber;
    wherein the surface of contact between the metering device and the lower sealing surface, the upper sealing surface, or both, comprises a low friction material, wherein the low friction material comprises polytetrafluoroethylene and glass fibers, fillers of carbon, graphite, molybdenum disulphide, ceramic, or aramid fiber.

12. The apparatus of claim 11, wherein the polytetrafluoroethylene is a glass-filled polytetrafluoroethylene comprising at least 15% or more glass-fill, or at least 25% or more glass fill, based upon the total weight of the low friction material.

13. The apparatus of claim 11, wherein the upper sealing surface comprises polytetrafluoroethylene bonded to the bottom of a metal floating cover plate.

14. The apparatus of claim 11, wherein the upper sealing surface is a floating cover plate comprising a solid piece of polytetrafluoroethylene.

15. The apparatus of claim 11, wherein the lower sealing surface comprises polytetrafluoroethylene bonded to the top side of a metal wear plate.

16. The apparatus of claim 11, wherein the lower sealing surface comprises a wear plate comprising a solid piece of polytetrafluoroethylene.

17. The apparatus of claim 11, wherein the plurality of springs result in less than 5 lbs/in$^2$ (0.35 kgs/cm$^2$) of sealing force being exerted on the metering device.

18. The apparatus of claim 11, wherein a torque required to rotate the drive shaft is about 55 ft-lbs (74.6 N-m) or less.

19. The apparatus of claim 11, wherein the torque required to rotate the drive shaft is about 20 ft-lbs (27.1 N-m) or less.

20. The apparatus of claim 11, wherein the drive shaft rotates at a speed of less than 0.13 rpm without stalling a drive motor.

21. The apparatus of claim 11, wherein a static coefficient of friction against polished steel of the low friction material is less than about 0.05.

* * * * *